United States Patent [19]

Kajiwara

[11] Patent Number: 4,947,952
[45] Date of Patent: Aug. 14, 1990

[54] SLOW SPEED CRUISING CONTROL APPARATUS

[75] Inventor: Yasuya Kajiwara, Himeji, Japan

[73] Assignee: Mitsubishi Denki Kabushiki Kaisha, Tokyo, Japan

[21] Appl. No.: 392,318

[22] Filed: Aug. 11, 1989

[30] Foreign Application Priority Data

| Sep. 5, 1988 | [JP] | Japan | 63-221915 |
| Sep. 5, 1988 | [JP] | Japan | 63-221916 |
| Sep. 5, 1988 | [JP] | Japan | 63-221917 |
| Sep. 5, 1988 | [JP] | Japan | 63-221918 |

[51] Int. Cl.$^5$ .................................. B60K 31/00
[52] U.S. Cl. ........................... 180/178; 180/169; 364/464.01
[58] Field of Search ............... 180/169, 170, 178, 179; 123/352; 364/426

[56] References Cited

U.S. PATENT DOCUMENTS

| 4,079,802 | 3/1978 | Kawata | 180/169 |
| 4,519,469 | 5/1985 | Hayashi et al. | 180/170 X |
| 4,621,705 | 11/1986 | Etoh | 180/169 |
| 4,706,195 | 11/1987 | Yoshino et al. | 364/426 |
| 4,729,104 | 3/1988 | Hara | 364/426 |

FOREIGN PATENT DOCUMENTS

| 247525 | 4/1986 | Japan . |
| 247526 | 4/1986 | Japan . |
| 255252 | 7/1987 | Japan . |

Primary Examiner—Charles A. Marmor
Assistant Examiner—Michael Mar
Attorney, Agent, or Firm—Sughrue, Mion, Zinn, Macpeak & Seas

[57] ABSTRACT

A slow speed cruising control apparatus comprises a setting switch for determining a slow speed cruising mode, a detector for detecting a quantity of depression of a brake pedal, an actuator for driving a throttle valve, a speed sensor for detecting the cruising speed of the automobile, a controller for controlling the cruising speed by changing the degree of opening of the throttle valve on the basis of a signal from the detector which corresponds to a quantity of depression of the brake pedal and a signal from the speed sensor, a range sensor for detecting a distance to an automobile going ahead of the automobile driven by a driver or an obstacle, and an alarm for generating an alarm on the basis of the output of the range sensor.

6 Claims, 3 Drawing Sheets ly to FIG. 1 thereof, there is shown a block diagram

SLOW SPEED CRUISING CONTROL APPARATUS

BACKGROUND OF THE INVENTION

1. Field of the Invention

The present invention relates to a slow speed cruising control apparatus for controlling a cruising speed of an automobile.

2. Discussion of Background

FIG. 5 is a block diagram of such apparatus as disclosed in, for instance, Japanese Unexamined Patent Publication No. 247526/1986. In FIG. 5, a reference numeral 1 designates a slow speed cruising mode setting switch, a numeral 2 designates a slow speed cruising mode cancelling switch, a numeral 3 designates an accelerator pedal, a numeral 5 designates an actuator for driving a throttle valve 6, a numeral 7 designates an engine, a numeral 8 designates a speed sensor, a numeral 9 designates a range sensor for detecting the distance to an automobile going ahead of the automobile driven by a driver, a numeral 10 designates an alarm device, a numeral 11 designates a controller, a numeral 12 designates an accelerator pedal sensor for detecting a quantity of depression of the accelerator pedal 3, a numeral 13 designates a selector lever position sensor, a numeral 14 designates an engine revolution sensor, a numeral 15 designates turn signal switch, a numeral 16 designates a throttle valve opening degree sensor, a numeral 17 designates an accelerator switch and a numeral 18 designates a brake control device.

The operation of the above-mentioned conventional control apparatus will be described.

When the driver operates the slow speed mode setting switch to select a slow speed mode, a signal from the accelerator sensor 12 which detects a quantity of depression of the accelerator pedal 3 is received by the controller 11 and the throttle valve 6 is opened by the actuator 5 to thereby increase the output of the engine 7. The throttle valve 6 is not opened in proportion to the depression of the accelerator pedal but it is operated for opening (or closing) so that the revolution speed is lower than a certain level regardless of the quantity of depression of the accelerator pedal. When the accelerator pedal 3 is released from the foot, the throttle valve is closed and the brake control device 18 is actuated to thereby stop the automobile.

Thus, in the conventional slow speed cruising control apparatus, the automobile runs at a speed lower than a predetermined speed by operating only the accelerator pedal 3. Accordingly, it is convenient when the automobile has to be moved at a very slow speed at the time of a traffic jam. It is preferable for an automobile to have a sensor 9 to detect an obstacle so that a braking mechanism is automatically operated to stop the automobile, and the at the same time, to actuate an alarm device 10 when an obstacle is detected in the front of the automobile. The slow speed cruising setting mode is cancelled by turning off the slow speed mode switch 2 or generating a turn signal.

In the conventional control apparatus, however, the size of it is inevitably large and expensive because of the presence of the throttle valve and the braking mechanism although the automobile can be moved and stopped by operating only the accelerator pedal. Further, a fail-safe mechanism which ensures safety against the mulfunction of the brake control device is also expensive.

SUMMARY OF THE INVENTION

It is an object of the present invention to provide a slow speed cruising control apparatus having a reduced number of structural elements to thereby simplify the construction and reduce the manufacturing cost while assuring an advantage of easy driving.

In accordance with the present invention, there is provided a slow speed cruising control apparatus which comprises a setting means for determining slow speed cruising mode, a detecting means for detecting a quantity of depression of a brake pedal, an actuator for driving a throttle valve, a speed sensor for detecting a cruising speed of the automobile, a controller for controlling the cruising speed by changing the degree of opening of the throttle valve on the basis of a signal from the detecting means which corresponds to a quantity of depression of the brake pedal and a signal from the speed sensor, a range sensor for detecting a distance to an automobile going ahead of the automobile driven by a driver or an obstacle, and an alarm means for generating an alarm on the basis of the output of the range sensor.

In accordance with the present invention, there is provided a slow speed cruising control apparatus which comprises a setting means for determining a slow speed cruising mode, a first detecting means for detecting a quantity of slippage of a driving wheel, a second detecting means for detecting a quantity of depression of a brake pedal, an actuator for driving a throttle valve, a speed sensor for detecting a cruising speed of an automobile, a controller for controlling the cruising speed by changing the degree of opening of the throttle valve on the basis of a signal from the first detecting means which corresponds to a quantity of slippage of the driving wheel, a signal from the second detecting means which corresponds to a quantity of depression of the brake pedal and a signal from the speed sensor, a range sensor for detecting a distance to an automobile going ahead of the automobile driven by a driver or an obstacle, and an alarm means for generating an alarm on the basis of the output of the range sensor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
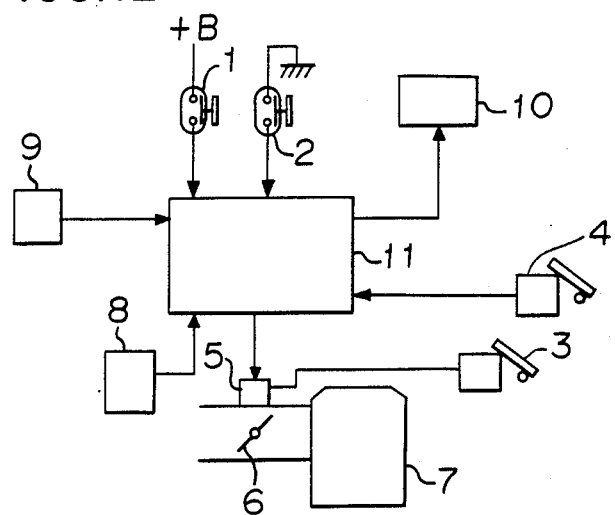
FIG. 1 is a block diagram of a first embodiment of the slow speed cruising control apparatus according to the present invention.

Referring to the drawings, wherein the same reference numerals designate the same or corresponding parts throughout the several views, and more particularly to FIG. 1 thereof, there is shown a block diagram of a first embodiment of the slow speed cruising control apparatus of the present invention.

In FIG. 1, a reference numeral 1 designates a slow speed cruising mode setting switch, a numeral 2 designates a slow speed cruising mode cancelling switch, a numeral 3 designates an accelerator pedal, a numeral 4 designates a braking pedal sensor, a numeral 5 designates an actuator for opening and closing a throttle valve 6, a numeral 7 designates an engine, a numeral 8 designates a speed sensor, a numeral 9 designates a range sensor for detecting a distance to an automobile going ahead of the automobile driven by a driver or an obstacle, a numeral 10 designates an alarming and displaying device, and a numeral 11 designates a controller.

The operation of the slow speed cruising control apparatus will be described. In ordinary cruising operations, when the accelerator pedal 3 is operated, the throttle valve 6 is opened, which increases the output of the engine 7 to thereby increase the speed of the automobile.

The slow speed cruising control apparatus of the present invention is useful in a case that an automobile has to be moved at a low speed at the time of a traffic jam wherein the cruising and the stopping of the automobile have to be frequently repeated. Namely, when a driver operates the slow speed cruising mode switch 1, the controller 11 detects the switching signal of the switch 1 so that a slow speed cruising mode is established and at the same time, the alarming and displaying device 10 notifies an alarm to the driver. In the slow speed cruising mode, the automobile runs at a predetermined speed, for instance, a speed of 10 km/H by having the brake mechanism being free. This can be obtained by adjusting the output of the engine by the controller 11 on the basis of the signal of the speed sensor 8 regardless of the quantity of a load even when the automobile goes up a slope. When the driver operates the brake, it functions depending on an amount of depression of the brake, and at the same time, the throttle valve is operated toward the direction of closing by the actuator so that the output of the engine is decreased. When the brake is depressed beyond a certain level, the throttle valve is entirely closed and the automobile is stopped by the action of the brake. In short, in the slow speed cruising mode, the speed of the automobile can be adjusted by operating the brake pedal, and the speed does not reach a certain level. When the driver wants to increase the speed, it is necessary to operate the accelerator pedal.

Thus, the actuator 5 receives both an instruction from the accelerator pedal 3 and an instruction from the controller 11. Accordingly, when the instruction from the accelerator pedal 3 and the instruction of the brake sensor 4 are simultaneously given, the instruction from the brake dominantes and the throttle valve is operated to be closed.

With the range sensor 9 installed in the control apparatus, the driver is notified by means of sound or light as an alarm when the distance between the automobiles, which depends on the speed of the automobile, is less than a predetermined value, for instance, 4 m at a speed ranging from 10 km/H to 7.5 km/H, 3 m at a speed ranging from 7.5 km/H to 5 km/H and 2 m or shorter at a speed lower than 5 km/H.

As the range sensor 9, various types sensor can be employed. For instance, a sensor utilizing ultrasonic waves may be used in a case that the distance between automobiles is small and the automobiles move at a low speed in a traffic jam. Or, a method of measuring the distance by a triangulation system by emitting light such as an infrared ray or a method of measuring a distance by detecting an image in the front of the automobile, may be used. Such method or the sensor can be used in a case that an automobile is garaged to a predetermined position by adjusting the speed while operating the brake.

The actuator for driving the throttle valve 6 may be a motor which may be directly driven by the controller 11. In this case, a reversible rotating type motor can be used so that the throttle valve which has been opened by the accelerator pedal can be closed by the motor.

The actuator can be of such a type that the throttle valve is driven by utilizing a negative pressure produced in an intake air pipe of the engine. In this case, the pressure of a negative pressure chamber is controlled by opening and closing a solenoid valve by the controller 11 because a diaphramgs is actuated by the negative pressure. The construction of such type of actuator that the throttle valve opened by the accelerator pedal is actuated in the closing direction is complicated. Accordingly, it is simple and inexpensive by constructing the actuator so as to only open the throttle valve without depressing the accelerator pedal. It is possible to use such actuator that the throttle valve is opened and closed by using a hydraulic pressure.

Thus, in the above-mentioned embodiment of the present invention, the speed of the automobile can be controlled by operating the brake by selecting the slow speed cruising mode and by adjusting the quantity of depression of the brake to thereby control the speed. Accordingly, a burden to the driver at the time of a traffic jam or garaging can be reduced. Further, the provision of the range sensor eliminates a danger such as collision. Further, the construction of the control apparatus can be simplified.

Figure 2:
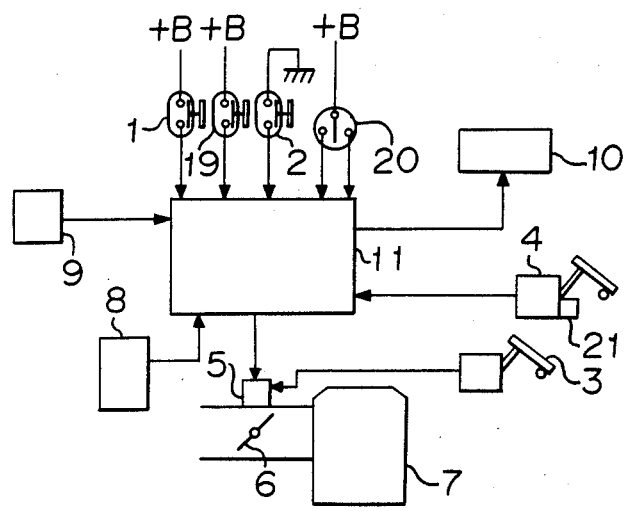
FIG. 2 is a block diagram of a second embodiment of the present invention.

FIG. 2 is a block diagram of a second embodiment of the slow speed cruising control apparatus according to the present invention. The control apparatus shown in FIG. 2 has the same construction as in FIG. 1 except that it further comprises a constant speed cruising mode setting switch 19, a speed increasing/decreasing switch 20 and a braking switch 21. Accordingly, the same reference numerals designate the same parts, and description of these parts is omitted.

The control apparatus of this embodiment is to reduce a burden to a driver by selecting a slow speed cruising mode when the automobile has to be driven at a low speed and is frequently stopped at the time of a traffic jam and by selecting a constant speed cruising mode when traffic condition is normal. The operation in this embodiment is substantially the same as that of the first embodiment as in FIG. 1, and only operation peculiar to this embodiment will be described.

In an automobile, braking effect depends on an amount of an depression of the brake. The throttle valve is rendered to be in a closing state so that the output of the engine is reduced depending on a signal from a sensor 4 for detecting an amount of depression of the brake. When the brake is operated for depression to a predetermined level, the throttle valve is entirely closed, and at the same time, the automobile is stopped by the action of the brake. In the slow speed cruising mode, the speed of the automobile can be changed by the speed increasing/decreasing switch 20 in a state of the brake pedal being free. The speed is increased by operating the accelerator pedal. It is, however, possible to reduce the speed to a predetermined value by operating the brake pedal. Accordingly, it is possible to move the automobile only by operating the brake pedal at the time of a traffic jam. When the accelerator pedal and the brake pedal are operated at the same time, the operation of the brake pedal dominantes and the throttle valve is actuated in the direction of closing.

In this embodiment, since a range sensor 9 is provided, it is possible that calculating is made to obtain a proper distance between automobiles on the basis of the speeds of the automobiles, and an alarm is generated by an alarm 10 to notify the driver by means of sound or light when an actual distance between the automobiles is smaller than the calculated proper distance between the automobiles.

On the other hand, when the constant speed cruising mode setting switch 19 is operated, the speed of the automobile at the time of opening the setting switch, which is obtained by the signal of the speed sensor 8 is memorized. A controller 11 adjusts the output of the engine by opening or closing the throttle valve 6 by means of an actuator 5 so that the said speed can be maintained. When the driver wishes to increase or decrease the speed of the automobile, the speed increasing/decreasing switch 20 is operated to determine a new speed. Further, the speed of the automobile can be temporarily increased by operating the accelerator pedal 3. The constant speed cruising mode can be cancelled by operating the braking switch 21 or the slow speed cruising mode cancelling switch 2.

The range sensor 9 operates to measure the distance between the automobiles even in the constant speed cruising mode. The controller usually calculates the proper distance between the automobiles. The calculation is carried out as follows. Namely, a stopping distance in a case that a car runs at a speed v is expressed by $a0V^2+vt0$ where a0 and t0 are respectively constants. However, a proper distance between automobiles is expressed by the relation of the speed of the automobile driven by the passenger and a relative speed of the automobile going ahead of the automobile driven by the passenger to the later automobile, i.e. a rate of change of the distance between the automobile ds/dt. For instance, the proper distance between the automobiles Sa can be calculated by using an equation $$Sa = vt0 - b\frac{ds}{dt},$$

where a b is constant. When the actual distance between the automobiles is smaller than the proper distance between the automobiles obtained by the above-mentioned equation, an alarm is generated from the alarm device 10.

Figure 3:
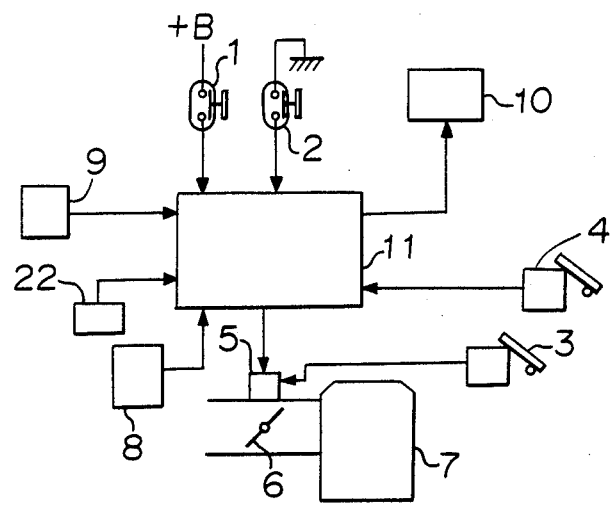
FIG. 3 is a block diagram of a third embodiment of the present invention.

FIG. 3 is a block diagram of a third embodiment of the slow speed cruising control apparatus according to the present invention. The construction of the third embodiment is substantially the same as that of the first embodiment except that it further comprises a sensor 22 for detecting the slippage of a driving wheel. Accordingly, the same reference numerals as in FIGS. 1 and 2 designate the same or corresponding parts, and therefore, despcription of these parts is omitted.

The operation peculiar to the third embodiment will be described and the operation having the same function as in FIGS. 1 and 2 is omitted. The third embodiment has a feature of controlling the slippage of an automobile. Namely, there often causes the slipping of the car body or the wheels when a large driving force is applied to the wheels on a road such as a snowy road or a freezing road. When the slip-detecting sensor 22 detects the existence of the slippage, the controller 11 closes the throttle valve 6 to reduce the output of the engine, whereby the slippage of the automobile can be minimized. As the slip-detecting sensor, a sensor for detecting the revolutional speed of the driving wheels or a sensor for detecting a speed to the ground may be used.

The slow speed cruising mode may be selected to perform smooth starting while the slippage of the automobile can be avoided. Specifically, when the brake is slowly raised in the depressing operation of the brake after the slow speed cruising mode has been selected, the braking force becomes small and at the same time, the throttle valve is slightly opened, whereby the output of the engine is increased. Accordingly, there is obtainable a balancing state between the braking force and a torque to rotate the wheels. Thus, the smooth starting of the automobile can be attained.

The slip-detecting sensor detects the slippage of the automobile and the slip is controlled by the controller 11. Accordingly, a stable cruising can be obtained.

Figure 4:
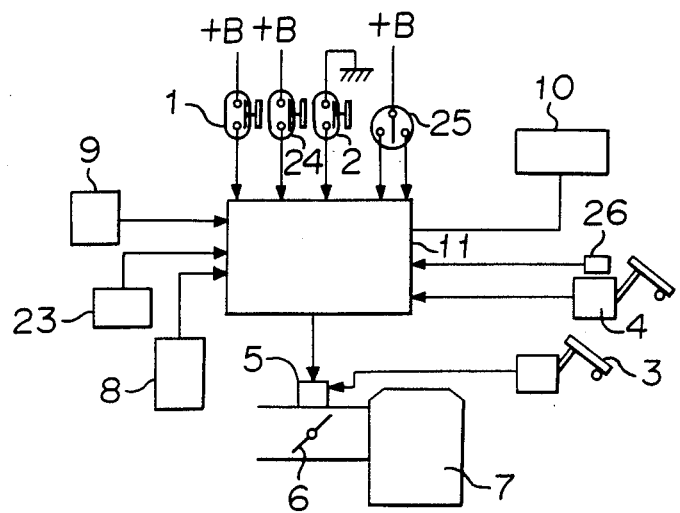
FIG. 4 is a block diagram of a fourth embodiment of the present invention.
Figure 5:
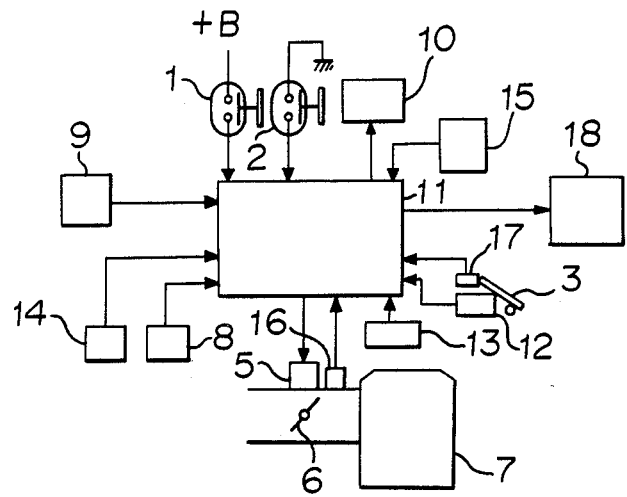
FIG. 5 is a block diagram of a conventional slow speed cruising control apparatus.

FIG. 4 is block diagram of a modified embodiment of the third embodiment as shown in FIG. 3. The construction of the embodiment as shown in FIG. 4 is substantially the same as that of the third embodiment except that it is further provided with a setting switch 24 for setting a stable cruising mode, a speed increasing/decreasing switch 25 and a brake switch 26. Accordingly, the same reference numerals as in FIG. 3 designate the same parts, and therefore, description of these parts is omitted.

In the operation, when the constant speed cruising mode setting switch 24 is operated, the speed at the time of setting obtained by the signal of the speed sensor 8 is memorized. The controller 11 adjusts the output of the engine by opening or closing the throttle valve 6 by the actuator 5 so that the speed can be maintained. The speed of the automobile can be increased or decreased by operating the speed increasing/decreasing switch 25; thus, a new speed can be determined. Further, the speed of the automobile can be temporarily increased by operating the accelerator pedal 3. The cancellation of the constant speed cruising mode can be performed by operating the brake switch 26 or the slow speed cruising mode cancellation switch 2. This mode can be cancelled by the same switch 2.

In a case of the constant speed cruising mode, the range sensor 9 is operated to measure the distance between the two automobiles, i.e. the automobile driven by the passenger and the automobile going ahead of the former. The controller usually operates a proper distance between the automobiles. In this case, a method of the operations is as follows. The stopping distance of an automobile running at a speed v is generally expressed by $a0v^2+vt0$ where a0 and t0 are respectively constants. The proper distance between the automobile can be expressed in a relation of a car speed to a relative speed with respect to the automobile going ahead of the automobile driven by the passenger, i.e. a rate of change ds/dt of the distance between the automobiles. For instance, the proper distance Sa between the automobiles can be obtained by using an equation $$Sa = vt0 - b\frac{ds}{dt},$$

where b is a constant. When an actual distance between the automobiles is smaller than the proper distance obtained by the above-mentioned formula, an alarm is generated from the alarm device 10.

In this embodiment, the driving wheels are prevented from slipping by reducing the output of the engine by driving the throttle valve 6 toward the closing direction when the slippage of the driving wheels is detected. Thus, with the slip detection sensor, the starting and the running of the automobile can be easy on a road easily causing slippage such as a snowy road or a freezing road.

Obviously, numerous modifications and variations of the present invention are possible in light of the above teachings. It is therefore to be understood that within the scope of the appended claims, the invention may be practiced otherwise than as specifically described herein.

What is claimed is:

1. A slow speed cruising control apparatus for controlling a cruising speed of an automobile, comprising:
   a setting means for determining a slow speed cruising mode and for maintaining a set cruising speed,
   a detecting means for detecting the amount of depression of a brake pedal by the driver of the automobile and for producing a signal which increases as a function of an increasing amount of depression of said brake pedal,
   an actuator for driving a throttle valve for regulating the cruising speed of the automobile by changing the degree of opening of said throttle valve,
   a speed sensor for detecting the cruising speed of the automobile,
   a controller for controlling said actuator, said controller decreasing the degree of opening of said throttle valve as a function of an increasing signal from said detecting means and said controller resuming said set cruising speed in the absence of a signal from said detecting means,
   a range sensor for detecting a preceding automobile or an obstacle and for producing an output signal which corresponds to the distance therebetween, and
   an alarm means for generating an alarm on the basis of the output signal of said range sensor.

2. The slow speed cruising control apparatus according to claim 1, wherein said alarm means generates an alarm when the distance to the preceding automobile or obstacle reaches a predetermined value which is previously determined on the basis of the cruising speed.

3. The slow speed cruising control apparatus according to claim 1, which further comprises a constant speed cruising mode determining means for determining a constant cruising mode and a speed increasing/decreasing means for generating an instruction of increasing or decreasing the cruising speed of the automobile wherein said alarm means generates an alarm when a value indicating the relation between the distance to an automobile going ahead of the automobile driven by the driver and a rate of change of time reaches a predetermined value or less which is previously determined.

4. A slow speed cruising control apparatus according to claim 1, further comprising:
   a further detecting means for detecting a quantity of slippage of a driving wheel, and wherein said controller is responsive to an output signal from said further detecting means for closing said throttle valve.

5. The slow speed cruising control apparatus according to claim 4, wherein said alarm means generates an alarm when the distance to the preceding automobile or obstacle reaches a predetermined value which is previously determined on the basis of the cruising speed.

6. The slow speed cruising control apparatus according to claim 4, which further comprises a constant speed cruising mode determining means for determining a constant cruising mode and a speed increasing/decreasing means for generating an instruction of increasing or decreasing the cruising speed of the automobile wherein said alarm means generates an alarm when a value indicating the relation between the distance to an automobile going ahead of the automobile driven by the driver and a rate of change of time reaches a predetermined value or less which is previously determined.

* * * * *